United States Patent [19]

Grantland et al.

[11] Patent Number: 5,737,401
[45] Date of Patent: Apr. 7, 1998

[54] FULL COIN BOX SIGNALLING DEVICE FOR USE WITH COIN TELEPHONES

[75] Inventors: Gary Grantland, Hartselle; Gregory L. Distler, Huntsville, both of Ala.

[73] Assignee: Quadrum Telecommunications, Inc., Huntsville, Ala.

[21] Appl. No.: 662,242

[22] Filed: Jun. 14, 1996

[51] Int. Cl.⁶ .................. H04M 17/00; G06M 1/27; G07F 9/08; G07D 5/08
[52] U.S. Cl. .................. 379/147; 194/224; 194/230; 194/317
[58] Field of Search .................. 379/143, 145–155; 194/215–224, 229, 230, 239, 240, 302, 317; 453/3, 4; 250/223 R, 578.1, 221

[56] References Cited

U.S. PATENT DOCUMENTS

| | | | |
|---|---|---|---|
| 4,124,775 | 11/1978 | Zarouni | 379/147 |
| 4,206,321 | 6/1980 | McElliott | 379/147 |
| 4,599,492 | 7/1986 | Otten | 379/148 |
| 4,625,078 | 11/1986 | Crouch et al. | 379/145 |
| 4,926,468 | 5/1990 | Smith et al. | 379/147 |
| 4,988,860 | 1/1991 | Wollet et al. | 453/4 |
| 5,084,613 | 1/1992 | Grantland | 379/148 |
| 5,574,479 | 11/1996 | Odell | 345/158 |

*Primary Examiner*—Curtis Kuntz
*Assistant Examiner*—Paul Loomis
*Attorney, Agent, or Firm*—Robert J. Black

[57] ABSTRACT

A coin box monitoring circuit for use in pay telephones, providing coin detection, coin volume totalization, and full coin box signaling to the telephone central office. An included coin chute assembly has three channels that cause nickels, dimes, and quarters to pass through specific locations within each channel. Light sources and light detectors detect the passage of coins. A microprocessor is utilized to control the light sources, monitor the detectors, and volumetrically count the coins passing through the coin chute. On reaching a full condition, a microprocessor then controls a relay to signal that the predetermined coin box level has been reached.

9 Claims, 2 Drawing Sheets

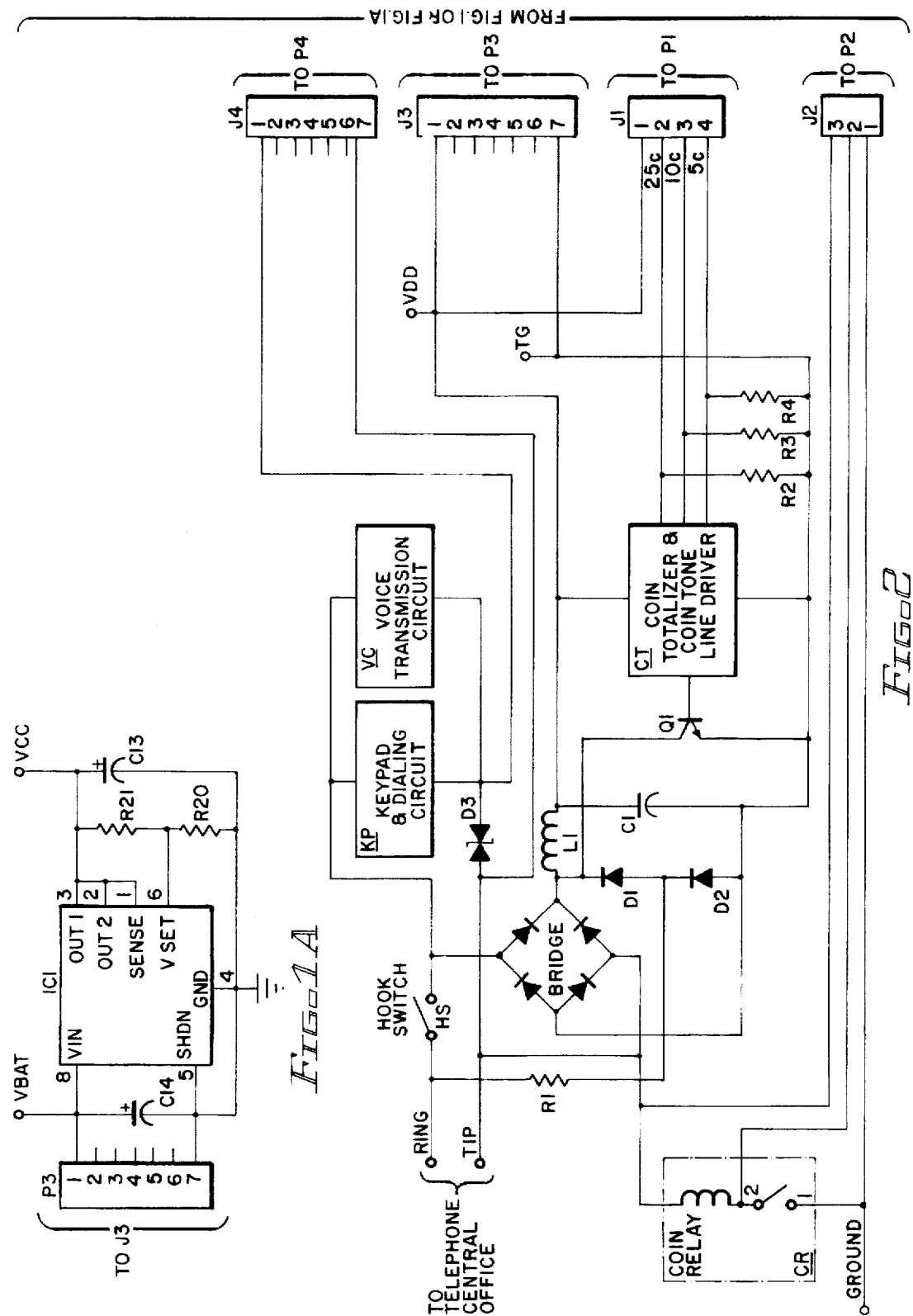

FULL COIN BOX SIGNALLING DEVICE FOR USE WITH COIN TELEPHONES

BACKGROUND OF THE INVENTION

1. Field of the Invention

The present invention is suitable for use in telephone paystations, like the Type 120B paystation telephone currently manufactured by Quadrum Telecommunications, Inc., and more particularly to apparatus able to make a volumetric estimate of the number of collected coins in the coin box of the pay telephone, including the ability to notify the telephone central office when predetermined level achieved.

2. Background Art

A search of the background art directed to the subject matter of the present patent application disclosed the following U.S. Pat. Nos.:

| U.S. Pat. No. | Inventor | Issue Date |
| --- | --- | --- |
| 4,096,933 | Massa | Jun 27, 1978 |
| 4,216,461 | Werth et al | Aug 5, 1980 |
| 4,282,575 | Hoskinson et al | Aug 4, 1981 |
| 4,509,633 | Chow | Apr 9, 1985 |
| 4,585,936 | Sellier | Apr 29, 1986 |
| 4,666,027 | Ostroski et al | May 19, 1987 |
| 4,988,860 | Wollet et al | Jan 29, 1991 |
| 5,084,613 | Grantland | Jan 28, 1992 |
| 5,377,807 | Kojima et al | Jan 3, 1995 |
| 5,460,256 | Levasseur | Oct 24, 1995 |
| 5,477,952 | Castellano et al | Dec. 26, 1995 |

U.S. Pat. No. 4,216,461 pertains to a sensing and counting device that employs a microelectronic circuit chip having a plurality of memory registers. It senses and counts the net coin intake and stores the net count in the registers.

U.S. Pat. No. 4,509,633 teaches an electronic coin validator that utilizes a diameter detection arrangement using two light emitting diode and opto-detector pairs to determine diameter by determining the actual average velocity of the coin as it travels down the runway.

U.S. Pat. No. 4,585,936 teaches an optical process to determine the dimensions of an object and movement with respect to the device itself. Determination of the speed facilitates determining the diameter of the coin and accordingly its value.

U.S. Pat. No. 4,988,860 teaches an electronic trigger mechanism employing a plurality of parallel channels each including one or more openings through which light beams pass with coins blocking light being detected by associated light detectors.

U.S. Pat. No. 5,084,613 teaches electronic circuitry for a telephone paystation wherein a coin operated trigger response to deposit of coins, selectively operates one of a plurality of signal generators.

U.S. Pat. No. 5,377,807 teaches a coin validator involving a coin acceptor section and a change control section. Optical control means provide connection between the elements for signals ultimately being sent to light emitting diodes which generate optical signals to a photo transistor.

U.S. Pat. No. 5,460,256 includes a processing means connected to first and second sensing means, each of which comprise a light source and associated sensors. Coins travel along an inclined rail and processing means consider two distinct time intervals, determined by measuring the leading and trailing edges of the coins moving along the rail.

U.S. Pat. No. 5,477,952 teaches a technique for monitoring coin deposits in coin operated machines, such as video games. Money may be collected by means of a hand held computer compared against internally stored information.

U.S. Pat. Nos. 4,096,933, 4,282,575, and 4,666,027 were of general interest only and appear to have little bearing on the present invention.

In general, coin trigger switches originally utilized a coin operated trigger cam and spring contacts assembled for each coin channel as utilized in multislot coin operated paystations. Such arrangements utilized a substantial number of moving parts that required substantial adjustments.

The next generation coin trigger switch involved technology, such as taught in U. S. Pat. Nos. 4,988,860 and 5,084,613, both of which are assigned to the same assignee as the present application. In the arrangements taught in the first patent, the invention utilized a coin chute assembly specifically arranged to provide separate paths for nickels, dimes and quarters. In the arrangement shown, two infrared emitters were mounted on one side of the coin chute assembly and to photodetectors mounted on the other side of the coin chute. Coins were then guided into specifically arranged channels so that a dime would break one light path, a nickel to break the other light path, and quarters would break both light paths. However, current trigger technology generally employed in most conventional telephone paystation provides means for detecting coins as they pass through the trigger switch but have no means for counting those coins either by value or by volume. Accordingly, it is the object of the present invention to provide a new and improved apparatus that is able to detect and discriminate coin values as well as from that value determine a volumetric value, to assist in determining whether the included coin box in the paystation is completely full or approaching a full condition.

SUMMARY OF THE INVENTION

The present invention is drawn to an electronic coin detector utilizing three channels to cause nickels, dimes, and quarters to pass through a specific location in each channel. Light detectors and light sources are utilized to detect the passage of the coins. A microprocessor is utilized to monitor the light detectors as coins pass through the coin chute.

Ultimately, the microprocessor operates a relay to generate a signal to the telephone central office that a predetermined coin box level has been reached. The apparatus, as indicated, utilizes a microprocessor based electronic trigger switch which incorporates pulsed electronic light emitting diode technology to detect and discriminate coin values. When a coin is identified, it is assigned a volumetric value according to the following table.

| COIN | VALUE |
| --- | --- |
| Quarter | 5 Units |
| Nickel | 4 Units |
| Dime | 2 Units |

The value of each coin is saved and the total count of coins in the relay hopper. Should a refund signal be detected as transmitted from the central office, the hopper unit will be cleared. However, if a collect signal is detected, the coins in the hopper are then added to the coin box total and then cleared. The microprocessor is able to count the collected coins and make a volumetric calculation to determine when the coins in the coin box have reached a predetermined level (e.g., 80% full). Once the box is determined to be full, the information relating to the coin box status is transferred to the telephone central office by simulating a "false" coin-stuck condition.

This "false" coin stuck condition is generated by causing a short circuit to be applied between the associated coin relay and ground. At the telephone central office, a test is performed for this ground condition to verify that the coin relay ground path is cleared, indicating no more coins are present in the coin relay hopper assembly. If the ground condition continues to be present, the telephone central office will then attempt to clear it by issuing a collect or refund signal in order to re-activate the coin relay. Should the ground condition continue, the central office then will issue a "stuck coin report" so that appropriate service personnel can be dispatched to the paystation to either clear the stuck coin, or in this case, clear the full coin box.

Also included in the telephone paystation is a normally closed switch located in the coin box vault. This switch is utilized to determine when the coin box is in its proper location. Once the coin box has been removed and replaced, the switch applies a signal to the microprocessor so that the microprocessor can clear the existing coin ground condition extending back to the telephone central office.

BRIEF DESCRIPTION OF THE DRAWINGS

A better understanding of the present invention may be had from consideration of the following detailed description taken in conjunction with the following drawing:

FIGS. 1 and 1A are schematic circuit diagram of a coin trigger switch and microprocessor associated circuitry for use in determining a full coin box condition in a paystation telephone.

FIG. 2 is a partial block diagram of a paystation adapted to utilize the present invention.

DESCRIPTION OF THE PREFERRED EMBODIMENT

Figure 1:
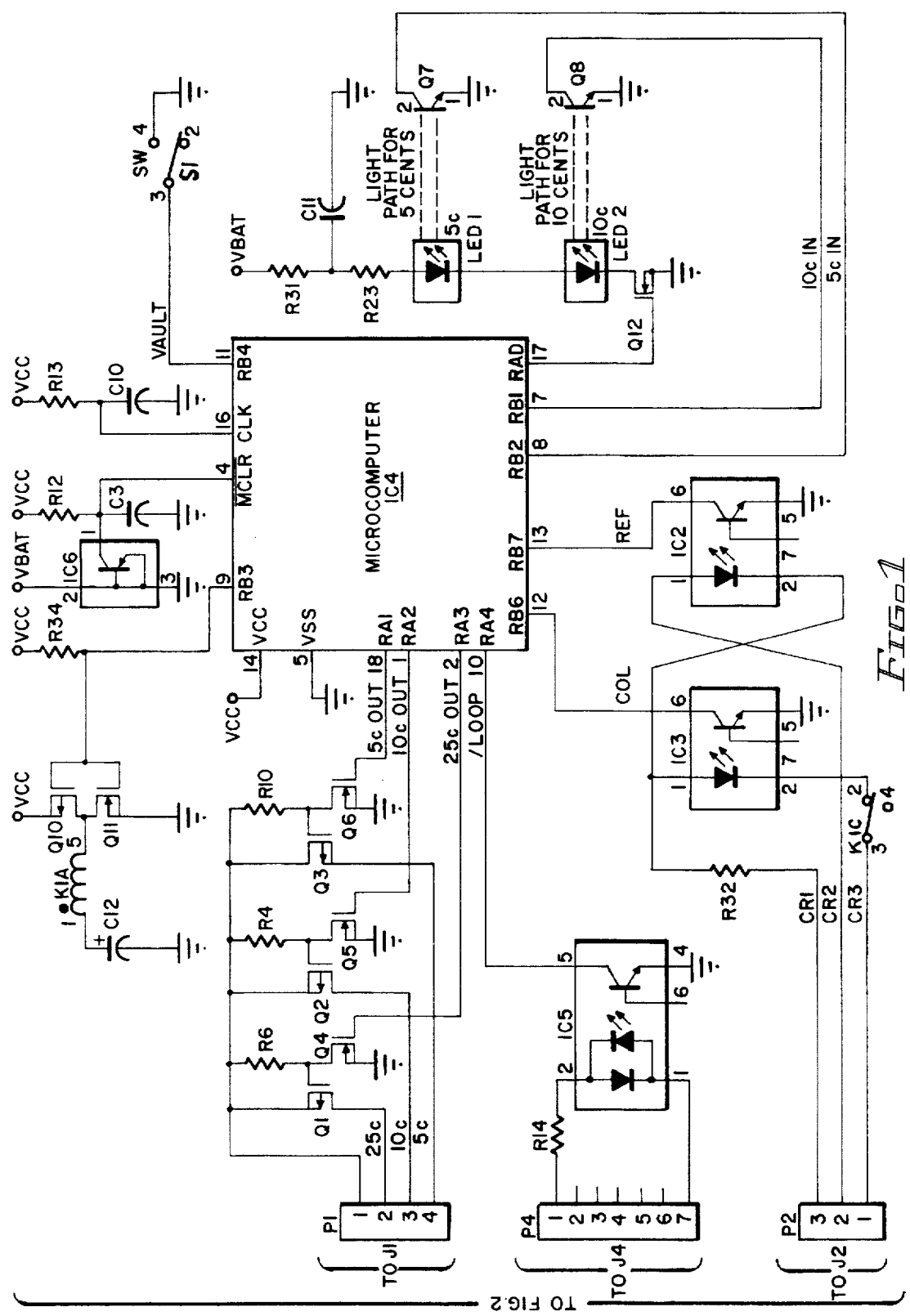

Referring now to FIGS. 1 and 1A for the schematic circuit diagram of the present invention, power for the unit is supplied from the telephone paystation chassis (shown in FIG. 2) being connected to integrated circuit IC1, (via P3 and J3) which is a low power regulator. Power is normally supplied when the telephone is in both the on-hook or off-hook conditions. In the on-hook condition, power is limited to only a few microamps, so that the present circuitry operates in a very low power mode, while the phone is in the on-hook condition. Integrated circuit IC1, the low power regulator, takes the voltage from the paystation at a voltage VDD and then regulates this voltage to 3.3 volts at VCC. Resistors R20 and R21 across the output from IC1 determine the regulator output voltage.

Integrated circuit IC6 is a voltage detector that monitors the input voltage (VBAT) to the voltage regulator. When the VDD voltage drops below 3.3 volts, the output of the voltage detector provides a low output level signal to reset microprocessor IC4.

It should be noted that microprocessor IC4 does not have its internal circuitry shown in detail inasmuch as it does not form a portion of the present invention, it only being required that the microprocessor IC4 operate to provide the functions as described hereinafter.

When the input voltage to regulator IC6 exceeds the 3.3 volt threshold, the output of the voltage detector, which is an open drain output, will go to a high impedance state allowing resistor R12 to pull the MCLR reset input high permitting the microprocessor to execute the code.

Leads 5¢, 10¢ and 25¢ and the associated VBAT connection interface to the paystation chassis (via P1 and J1) of FIG. 2. The chassis coin trigger switch input is referenced to the negative side and requires an input level equal to VDD, i.e., the positive side.

Transistors Q1 through Q6 and resistors R4, R6, and R10 provide level conversion required to interface 3.3 volt logic from the microprocessor IC4 to the paystation chassis (FIG. 2).

The input to integrated circuit IV5 (J4) is connected to the paystation hookswitch circuitry (at P4) and monitors that circuitry to determine when the phone is in its off-hook condition with available power from the central office (via leads tip and ring) being connected to the telephone. In this condition, current flows through resistor R14 and integrated circuit IC5 which effectively is an opto-coupler which monitors current flowing through its circuitry. Microprocessor IC4 monitors the output of opto-coupler IC5 to determine when to look for coins passing through the trigger switch assembly. If current is not present at pins 1 and 2 of integrated circuit IC5, i. e., the microprocessor will operate in its low power or standby mode.

Integrated circuits IC2 and IC3 are trigger switch drivers, which monitor the voltage across the coin relay CR (coin relay trigger switch inputs CR1, CR2, and CR3, connected via J2 and P2) included in the paystation telephone. When the voltage across coin relay trigger switch input leads CR1 and CR2 reach a value sufficient enough to operate the coin relay, either opto-coupler driver IC2 or IC3 will operate depending upon the polarity of the coin relay voltage. Should a collect signal be applied to the coin relay, lead CR1 will be positive with respect to lead CR2. This polarity will cause the transistor of opto-coupler IC3 to turn on. In turn, this signal is connected to pin 12 of the microprocessor to signal when coins are collected. Should a refund signal be applied to the coin relay, lead CR1 will be negative with respect to lead CR2. This polarity will then cause the transistor of opto-coupler IC2 to turn on with the resultant signal being applied to pin 13 of the microprocessor IC4, indicating to the microprocessor that coins have been refunded. Relay contacts K1C associated with relay coil K1A are connected to coin relay trigger switch input leads CR3 and CR2 are in parallel with the coin contacts on the coin relay mounted on the associated paystation chassis (FIG. 2).

Pin 9 of the microprocessor IC4 is used to operate relay K1. Relay K1 is a latching relay. When transistor Q10 is operated, capacitor C12 will be charged through the coil K1A of relay K1. This charging current through the relay coil operates the relay so that at contacts K1C, previously noted, pins 2 and 3 will be closed. Capacitor C12 is then discharged through relay K1 when transistor Q10 turns off and transistor Q11 turns on. This discharge circuit passing through relay coil K1A effectively operates the relay so that the pin that contacts pins 2 and 3 goes to an open condition.

Vault switch S1 is mounted on the telephone paystation in such a manner that the switch contacts are normally open. When the coin box is removed from the paystation, the vault switch contacts will close providing a ground on pin 11 of microprocessor IC4.

Two infrared light emitting diodes LED1 and LED2 are pulsed on by the microprocessor IC4 at pin 17 effectively operating transistor Q12. When current is flowing through light emitting diode LED1, a light beam is then extended through the coin chute assembly to phototransistor Q7. This light beam will turn on phototransistor Q7 which is connected to pin 8 of the microprocessor. When current is flowing through light emitting diode LED2, a light beam will be passed through the coin chute assembly to phototransistor Q8. This light beam will turn on phototransistor Q8 which is connected to pin 7 of the microprocessor. The microprocessor turns on current to light emitting diode LED1 and LED2 once every five milliseconds by turning on transistor Q12. When transistor Q12 is on, the microprocessor will read the inputs from phototransistors Q7 and Q8. Should a nickel be in the coin chute when light emitting diodes LED1 and LED2 are on, phototransistor Q7 will not turn on. If a dime is in the coin chute then phototransitor Q8 will not turn on, however, if a quarter is in the coin chute neither transistor Q7 or Q8 will turn on. Separate and distinct outputs from phototransistors Q7 and Q8 are provided at pins 7 and 8 of the microprocessor, for determining which type of coin has passed through the coin chute and broken the light paths extending therethrough.

A more thorough understanding of the present invention will be had by taking the following description of operation of the circuitry which has been previously described above. The present circuitry is initialized when the unit is installed in a telephone paystation, particularly a paystation like the Type 120B as manufactured by Quadrum Telecommunications, Inc.

When the circuitry is initialized, power is applied through the leads extending from the paystation chassis (via P3 and J3) to integrated circuit IC1. The power-on reset circuit of integrated circuit IC6 will then insure that power is stable before the MCLR input is released which allows the microprocessor to start executing instructions from its internal program memory.

Installation of the coin box will operate the vault switch S1 which is also connected to the microprocessor at pin 11. Initially, the coin box count of the microprocessor internally is initialized to zero when the coin box is installed. The present circuitry will now go into its operating mode when it detects that a phone is in the off-hook condition by virtue of the leads (via P4 and J4) extending to integrated circuit IC5 by detecting a low condition at the output of optocoupler IC5.

In the operate mode, the microprocessor monitors the coin chute status every five milliseconds, by pulsing the infrared light emitting diodes LED1 and LED2 and reading the inputs RB1 and RB2 which extend from transistors Q8 and Q7. Coins being deposited into the telephone paystation pass through the coin chute (not shown) and are held in the coin relay (CR) hopper (not shown) until they are either collected or refunded. Should a refund signal be applied to the paystation telephone (from the telephone central office), a refund signal will be detected by opto-coupler IC2 and the microprocessor IC4 will clear the hopper coin count. However, if a collect signal is applied to the pay phone, a collect signal will be detected by opto-coupler IC3 and the microprocessor will add the hopper count to the coin box total count and clear the hopper coin count. When a predefined volume of coins are present in the coin box, based on the volumetric count previously outlined, the microprocessor will operate relay contacts K1C. When the collect signal is detected and the coin box total exceeds the full box threshold, the K1C relay contacts will be closed. Two and one-half seconds after the collect/refund operation is detected, relay K1C contacts will be open for 2½ seconds. After the 2½ second open condition is complete, K1 contacts will be closed again and will remain closed until another collect or refund operation is detected, or until the full coin box is removed.

This initial 2½ second period when the K1C contacts are closed will provide adequate time for the telephone central office equipment to operate the coin relay more than one time. This condition signals a stuck coin condition to the telephone central office and a maintenance report will be generated indicating this condition. Further testing on the line then can be performed to see if the condition still exists. Should the condition still exist, it can be assumed that a stuck coin is present requiring maintenance or that the coin box has reached a predetermined level (approximation full) and that the present circuitry has placed a ground condition on the line to simulate a full coin box.

A second 2½ second period when the K1C contacts are open is intended to indicate a condition where no ground is present. This latter or open condition signals to the central office that the coin relay ground condition is cleared and to quit providing a collect or refund signal. At this point, coin relay ground condition is reapplied after the second 2½ second period. This then provides a ground path that can be detected with additional tests as conducted by the telephone central office. When service personnel arrive and the full coin box is removed, the vault switch will again indicate this condition to the microprocessor IC4. The microprocessor will then zero the coin box count and remove the ground caused by the K1C contacts and the cycle can be repeated.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A coin box monitoring circuit for use in a telephone paystation connected to a telephone central office, said paystation including a source of electrical power, a hookswitch, a coin relay including a trigger switch and a coin hopper, a plurality of coin paths extending to said coin hopper, a coin vault including a coin box located therein, said coin box monitoring circuit comprising:

a microprocessor;

a plurality of light sources adjacent to said coin paths including a circuit connection from said microprocessor;

a plurality of light detectors each adjacent to one of said coin paths and adjacent to an associated light source, each of said detectors including circuit connections to said microprocessor, said light sources periodically operated in response to said microprocessor;

full coin box signaling means connected between said microprocessor and said coin relay;

said detectors operated in response to the passage of each coin deposited through at least one of said light paths during operation of said light source, to cause said microprocessor to tabulate a volumetric unit for each of said coins passing through at least one of said light paths;

said full coin box signaling means operated in response to the volumetric units counted by said microprocessor being equal to a predetermined amount, to apply a signal to said coin relay to provide an indication at said telephone central office that the coin box is at a maximum capacity.

2. A coin box monitoring circuit as claimed in claim 1 wherein:

said coin paths included in said telephone paystation include a nickel path;

a dime path;

and a quarter path;

said light sources included in said coin box monitoring circuit including a nickel light source;

and a dime light source;

a nickel light detector adjacent to one of said coin paths and adjacent to said nickel light source;

and a dime light detector adjacent to another one of said coin paths and adjacent to said dime light source;

said microprocessor operated to tabulate two volumetric units for each dime deposited, four volumetric units for each nickel deposited, and five volumetric units for each quarter deposited.

3. A coin box monitoring circuit as claimed in claim 1 wherein:

said coin box monitoring circuit further includes a collect signal detector circuit connected between said coin relay and said microprocessor operated in response to receipt of a collect signal from said telephone central office applied to said coin relay, to record the volumetric units tabulated by said microprocessor and further operated to cause said microprocessor to totalize all of said volumetric units tabulated by said microprocessor.

4. A coin box monitoring circuit as claimed in claim 1 wherein:

said coin box microprocessor further includes a refund detector connected between said coin relay and said microprocessor operated in response to a refund signal applied to said coin relay from said telephone central office to clear said microprocessor of said volumetric units tabulated by said microprocessor.

5. A coin box monitoring circuit as claimed in claim 1 wherein:

said coin box monitoring circuit further includes a power circuit connected to said telephone paystation, including a power regulator circuit operated to regulate voltage from said paystation to a predetermined value for utilization by said microprocessor and circuitry associated therewith.

6. A coin box monitoring circuit as claimed in claim 5 wherein:

said power circuit further includes a power monitoring circuit operated to monitor input voltage from said telephone paystation to said voltage regulator, said regulator operated to place said microprocessor in an operating mode when said detected voltage is at least equal to said predetermined value from said regulator.

7. A coin box monitoring circuit as claimed in claim 1 wherein:

there is further included a current monitoring circuit connected between said hookswitch and said microprocessor operated in response to detection of an off-hook condition by said hookswitch to signal said microprocessor to periodically operate said light sources.

8. A coin box monitoring circuit as claimed in claim 1 wherein:

there is further included a plurality of integrated circuit trigger switch drivers each connected between said microprocessor and coin relay trigger switch inputs to said telephone paystation to operate said trigger switch inputs associated with said telephone paystation in response to said microprocessor.

9. A coin box monitoring circuit as claimed in claim 1 wherein:

said coin vault further includes switching means connected to said microprocessor operated in response to the presence of said coin box in said coin box vault to condition said microprocessor for operation;

said switching means further operated in response to removal of said coin box from said coin vault, to terminate operation of said microprocessor and clear the volumetric count of coins deposited in said coin box as tabulated by said microprocessor.

* * * * *